(12) United States Patent
Suzuki et al.

(10) Patent No.: US 10,190,540 B2
(45) Date of Patent: Jan. 29, 2019

(54) FUEL SUPPLY SYSTEM, SCRAMJET ENGINE AND METHOD FOR OPERATING THE SAME

(71) Applicant: MITSUBISHI HEAVY INDUSTRIES, LTD., Tokyo (JP)

(72) Inventors: Kenji Suzuki, Tokyo (JP); Atsushi Kuroyanagi, Tokyo (JP); Toshinobu Yasutake, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1107 days.

(21) Appl. No.: 13/914,683

(22) Filed: Jun. 11, 2013

(65) Prior Publication Data

US 2014/0208767 A1     Jul. 31, 2014

(30) Foreign Application Priority Data

Jan. 30, 2013   (JP) ................... 2013-015092

(51) Int. Cl.
     *F02K 9/68*        (2006.01)
     *F02K 7/14*        (2006.01)
     *F02C 7/22*        (2006.01)

(52) U.S. Cl.
CPC .................. *F02K 9/68* (2013.01); *F02K 7/14* (2013.01); *F02C 7/22* (2013.01); *F05D 2220/10* (2013.01)

(58) Field of Classification Search
CPC .......... F02K 9/68; F02K 7/14; F05D 2220/10; F02C 7/22; F23R 3/40
See application file for complete search history.

(56) References Cited

U.S. PATENT DOCUMENTS

| | | |
|---|---|---|
| 5,165,224 A | 11/1992 | Spadaccini et al. |
| 5,232,672 A | 8/1993 | Spadaccini et al. |
| 5,235,804 A | 8/1993 | Colket, III et al. |
| 5,313,790 A | 5/1994 | Barr |
| 5,337,553 A * | 8/1994 | Barr .................. F02C 7/14 |
| | | 60/780 |

(Continued)

FOREIGN PATENT DOCUMENTS

| | | |
|---|---|---|
| EP | 0 226 289 | 6/1987 |
| EP | 2 233 727 | 9/2010 |

(Continued)

OTHER PUBLICATIONS

Decision to Grant a Patent dated Sep. 7, 2016 in corresponding JP Application No. 2013-015092, with English Translation.

(Continued)

*Primary Examiner* — William H Rodriguez
*Assistant Examiner* — Thomas Burke
(74) *Attorney, Agent, or Firm* — Wenderoth, Lind & Ponack, L.L.P.

(57) ABSTRACT

In order to stably use a catalyst for pyrolysis and supply a reformed fuel, the fuel supply system includes a fuel reforming section which pyrolyzes a hydrocarbon system fuel by the heat of the combustion chamber to generate the reformed fuel. The fuel reforming section includes a preheat vaporization section provided on the combustion chamber, and a decomposition reaction section that is provided on the preheat vaporization section and includes the catalyst for pyrolysis. The preheat vaporization section heats the fuel, the decomposition reaction section pyrolyzes the heated fuel to generate the reformed fuel, and the fuel reforming section supplies the reformed fuel to the combustion chamber. The reforming catalyst includes a zeolitic catalyst.

12 Claims, 9 Drawing Sheets

(56) References Cited

U.S. PATENT DOCUMENTS

| | | | |
|---|---|---|---|
| 5,394,685 A | 3/1995 | Kesten et al. | |
| 5,792,338 A * | 8/1998 | Gosling | C10G 35/095 208/64 |
| 6,434,473 B1 | 8/2002 | Hattori | |
| 2005/0204919 A1 | 9/2005 | Spadaccini et al. | |
| 2007/0032690 A1 | 2/2007 | Ghosh et al. | |
| 2007/0078285 A1* | 4/2007 | Dagle | C07C 41/01 568/698 |
| 2007/0175222 A1 | 8/2007 | Donohue et al. | |
| 2009/0186754 A1 | 7/2009 | Elia et al. | |
| 2010/0242437 A1* | 9/2010 | Jarmon | B64C 30/00 60/266 |
| 2011/0237850 A1 | 9/2011 | Luetkens, Jr. et al. | |

FOREIGN PATENT DOCUMENTS

| | | |
|---|---|---|
| JP | 52-46216 | 4/1977 |
| JP | S62-95388 | 5/1987 |
| JP | H02-75350 | 3/1990 |
| JP | 6-507956 | 9/1994 |
| JP | H06-507694 | 9/1994 |
| JP | H06-507957 | 9/1994 |
| JP | H09-122638 | 5/1997 |
| JP | H11-90224 | 4/1999 |
| JP | H11-253807 | 9/1999 |
| JP | 2000-234879 | 8/2000 |
| JP | 2001-107750 | 4/2001 |
| JP | 2003-81607 | 3/2003 |
| JP | 2005-273658 | 10/2005 |
| JP | 2007-205353 | 8/2007 |
| JP | 2009-502501 | 1/2009 |
| JP | 2011-507697 | 3/2011 |

OTHER PUBLICATIONS

Extended European Search Report dated Jan. 3, 2018 in European Application No. 13170949.5.

* cited by examiner

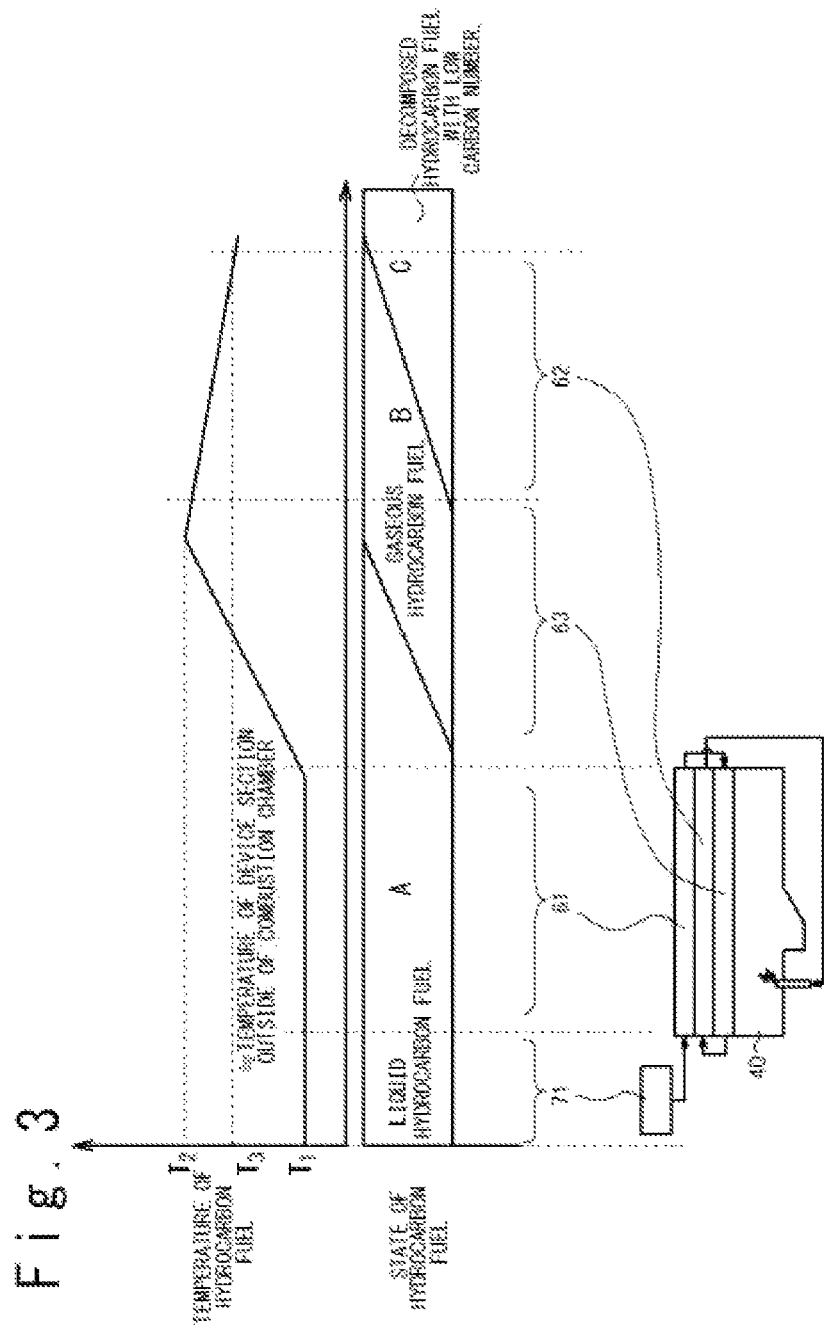

FUEL SUPPLY SYSTEM, SCRAMJET ENGINE AND METHOD FOR OPERATING THE SAME

INCORPORATION BY REFERENCE

This patent application claims a priority on convention based on Japanese Patent Application No. 2013-015092. The disclosure thereof is incorporated herein by reference.

TECHNICAL FIELD

The present invention rerates to a scramjet engine which generates a driving force by supersonic combustion, and particularly to a fuel supply system of the scramjet engine.

BACKGROUND ART

In order to stabilize supersonic combustion using a fuel of hydrocarbon system, it is desirable to increase a rate of hydrocarbon with small carbon number in a fuel, and keep a distribution of the carbon number constant in the fuel. Also, since the hydrocarbon with small carbon number is a gas state at normal temperature, when the hydrocarbon with small carbon number is mounted on a fuel tank, Fuel on Board cannot be increased and supersonic combustion (supersonic flight) cannot be realized for long periods of time. Therefore, it is considered to mount hydrocarbon with large carbon number as a main component, which is liquid at normal temperature, on the fuel tank, and decompose the liquid hydrocarbon fuel by heat of an engine during a flight for obtaining a reformed fuel that includes hydrocarbon with small carbon number as a main component.

Patent literature 1 discloses a heat management system of a propulsion engine for a supersonic and hypersonic aircraft. The system uses a single flow of endothermic fluid as a fuel and a heatsink for cooling the engine. The system includes a plurality of heat exchanger arranged in series. Each heat exchanger includes a reaction section having a catalyst so as to exchange heat with a heat source section. The single flow of fluid flows through each of the reaction section and the heat source section. Heat for a reaction in the reaction section is given from fluid in the heat source section, and thereby the fluid is cooled. This cooled fluid is heated again when flowing through a hot section of the engine, and flows toward other reaction section or flows toward a combustor of the engine to be fired.

Patent literature 2 discloses a method of enhancing combustion speed to expand a limit of an accidental fire in a high-speed propulsion unit such as a ramjet and scramjet engine. A flow of a hydrocarbon system fuel is decomposed by a catalyst to generate hydrogen and a fuel resolvent of low-molecular weight. The hydrogen and the fuel resolvent of low-molecular weight are introduced into a combustor of the high-speed propulsion unit with a flow of the hydrocarbon system fuel which is not decomposed. According to this method, an operation range of the combustor expands, and a high combustion speed and an enhancement of flame stability are achieved by higher-speed diffusive mixing. This process effectively expands an operation limit of a gas turbine, especially of a ramjet and scramjet combustor.

Moreover, patent literature 2 discloses followings. The fuel is vaporized in a catalytic reaction section to be decomposed by catalysts into hydrogen and fuel resolvent of low-molecular weight. What type of fuel is generated depends on what type of fuel is introduced into the reaction section. Preferable catalysts used in the reaction section include platinum group metals such as platinum, rhodium, iridium, and palladium. It is indicated that catalysts including other metals such as nickel, chromium, and cobalt are also effective. The catalysts may be composed by a single metal, and may be composed by a combination of appropriate metals.

In a catalytic reaction, there is an effective temperature range for respective catalysts, and the catalytic reaction should be managed in this range. However, since a temperature of a combustion chamber of the scramjet engine is very high and is equal to or more than thousands degrees C., it is very difficult to control a temperature of the catalyst arranged near the combustion chamber to be a desired temperature by using a heat generated by the combustion chamber. When the heat supplied to a catalytic layer is excessive, there is a possibility that the temperature of the catalyst becomes too high, the catalyst is inactivated, heat decomposition becomes difficult, and generation of the reformed fuel becomes difficult. Furthermore, when a temperature of a catalytic reaction region is unstable, there is a possibility that fuels of liquid state and gas state are mixed, the catalyst is stripped from a flow channel by vaporization/bumping of fuels to block the flow channel, and supply of the reformed fuel becomes difficult.

CITATION LIST

[Patent literature 1] U.S. Pat. No. 5,337,553
[Patent literature 2] U.S. Pat. No. 5,394,685

DISCLOSURE OF INVENTION

An object of the present invention is to provide a fuel supply system, a scramjet engine and a method for operating the same, which are able to decompose a fuel by heat of a combustion chamber to generate a reformed fuel, and stably supply the reformed fuel when the reformed fuel is combusted in the combustion chamber, in a scramjet engine. Furthermore, another object of the present invention is to provide a fuel supply system, a scramjet engine and a method for operating the same, which are able to stably use the reformed fuel for heat decomposition in a scramjet engine. Further another object of the present invention is to provide a fuel supply system, a scramjet engine and a method for operating the same, which are able to enhance heat energy efficiency in a scramjet engine.

These objects, other objects, and effects of the present invention will be easily confirmed by the below explanation and attached drawings.

The fuel supply system according to the present invention includes a fuel reforming section configured to decompose a hydrocarbon system fuel by heat from a combustion chamber of a scramjet engine to generate a reformed fuel, and cool the combustion chamber. The combustion chamber includes a preheat vaporization section arranged on the combustion chamber, and a decomposition reaction section including a reforming catalyst for pyrolysis. The preheat vaporization section heats the fuel. The decomposition reaction section decomposes the heated fuel to generate a reformed fuel. The fuel reforming section supplies the reformed fuel to the combustion chamber. The reforming catalyst includes a zeolitic catalyst.

In the above-mentioned fuel supply system, the zeolitic catalyst may include H-ZSM-5 catalyst.

In the above-mentioned fuel supply system, the zeolitic catalyst may support platinum group elements.

In the above-mentioned fuel supply system, the reforming catalyst may further include an oxidized catalyst which supports platinum group elements.

In the above-mentioned fuel supply system, the fuel reforming section may further include an outside cooling section provided on the decomposition reaction section. The fuel may be supplied to the preheat vaporization section via the outside cooling section.

In the above-mentioned fuel supply system, a temperature of the decomposition reaction section may be equal to or more than 400° C. and less than 600° C.

In the above-mentioned fuel supply system, a cross-section of a flow channel of the preheat vaporization section may be a triangle, and its bottom side may contact an upper side of the combustion chamber. A cross-section of a flow channel of the decomposition section may be an inverted triangle, and its two lower sides may contact each of adjacent upper sides of adjacent two triangles of the preheat vaporization section.

In the above-mentioned fuel supply system, a cross-section of a flow channel of the preheat vaporization section may be a triangle, and its bottom side may contact an upper side of the combustion chamber. A cross-section of a flow channel of the decomposition section may be a diamond shape, and its bottom sides may contact each of adjacent upper sides of adjacent two triangles of the preheat vaporization section.

A scramjet engine according to the present invention includes an air compression section, an injector, a combustion chamber, and a fuel supply system. The air compression section compresses an air to generate a compressed air. The injector sprays a reformed fuel in the compressed air. In the combustion chamber, the reformed fuel is combusted. The fuel supply system is provided on the combustion chamber and described in either above paragraphs.

A method of operating scramjet engine according to the present invention is a method of operating a scramjet engine which includes an air compression section, an injector, a combustion chamber, and a fuel reforming section. The method includes: a step of compressing an air to generate a compressed air by the air compression section; a step of spraying a reformed fuel in the compressed air by the injector; a step of combusting the reformed fuel in the combustion chamber; and a step of decomposing a hydrocarbon system fuel by a heat of the combustion chamber and generating the reformed fuel to cool the combustion chamber, by the fuel reforming section. The step of generating the reformed fuel to cool the combustion chamber includes: a step of heating the fuel by a preheat vaporization section provided on the combustion chamber; and a step of generating the reformed fuel by decomposing a fuel that is heated in a decomposition reaction section that is provided on the preheat vaporization section and includes a reforming catalyst for pyrolysis.

According to the present invention, it is possible to stably supply a reformed fuel when heating and decomposing a fuel by the heat of the combustion chamber to generate the reformed fuel and combusting the reformed fuel at the combustion chamber of the scramjet engine. Also, according to the present invention, in the scramjet engine, a reforming catalyst for pyrolysis can be stably used. Further, according to the present invention, in the scramjet engine, heat energy efficiency can be enhanced.

BRIEF DESCRIPTION OF DRAWINGS

FIG. 3 is a graph showing an example of a relation between a state and a temperature of a fuel in a fuel supply system according to the embodiment.

DESCRIPTION OF EMBODIMENTS

Hereinafter, referring to the attached drawings, a fuel supply system, a scramjet engine and a method for operating the same according to the present embodiment will be explained.

Figure 1:
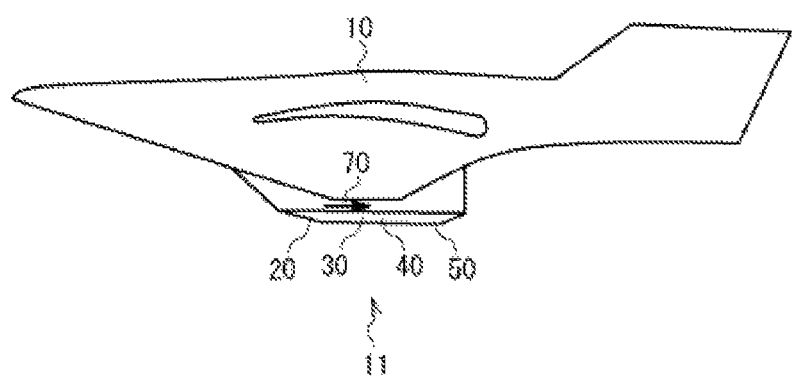
FIG. 1 is a schematic view showing a configuration example of an aircraft to which a scramjet engine according to an embodiment is applied.

Configurations of the fuel supply system and the scramjet engine according to the present embodiment will be described. FIG. 1 is a schematic view showing a configuration example of an aircraft to which a scramjet engine according to this embodiment is applied. This aircraft includes an airframe 10 and a scramjet engine 11 included in the airframe 10. The scramjet engine 11 is an engine which generates a driving force by supersonic combustion, and includes a compression section 20, an injector 30, a combustion chamber 40, and a nozzle 50. The air compression section 20 compresses air introduced from the outside and generates a compressed air to supply to the combustion chamber 40. The injector 30 sprays a reformed fuel in an air current 70 of the compressed air, in the combustion chamber 40. In the combustion chamber 40, the reformed fuel is combusted. The nozzle 50 supplies combustion gas which is generated by combustion of the reformed fuel.

Here, the combustion chamber 40 becomes high temperature because the reformed fuel is combusted. Therefore, the combustion chamber 40 must be cooled to prevent damage of the combustion chamber 40. On the other hand, for appropriate combustion in the combustion chamber 40, it is necessary to pyrolyze a liquid fuel whose main component is hydrocarbon with large carbon number to generate the reformed fuel whose main component is hydrocarbon with small carbon number. In this embodiment, these requests are addressed by the following configuration of the scramjet engine.

Figure 2A:
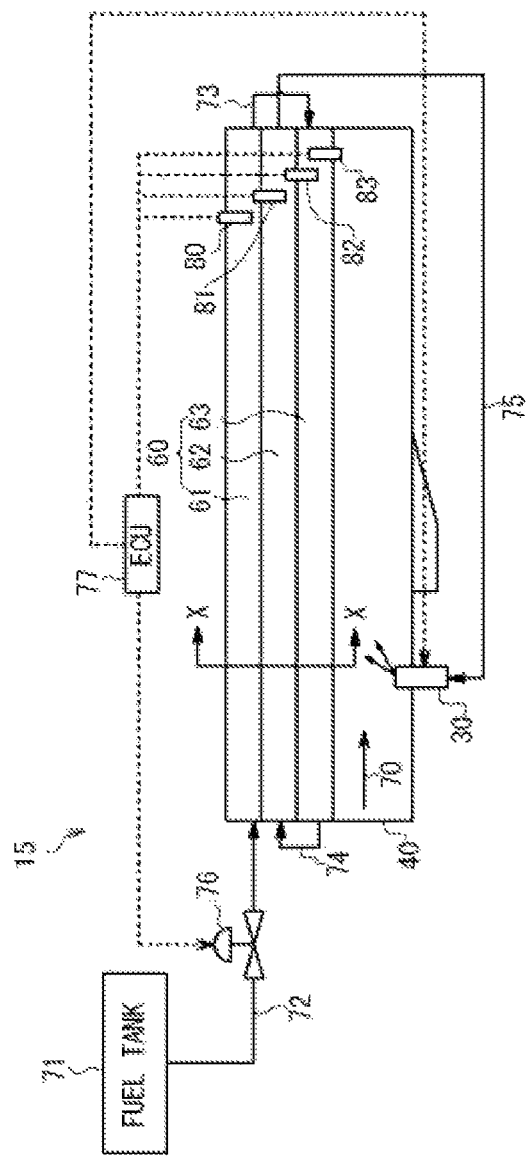
FIG. 2A is a schematic block diagram showing a configuration example of the scramjet engine according to the embodiment.
Figure 2B:
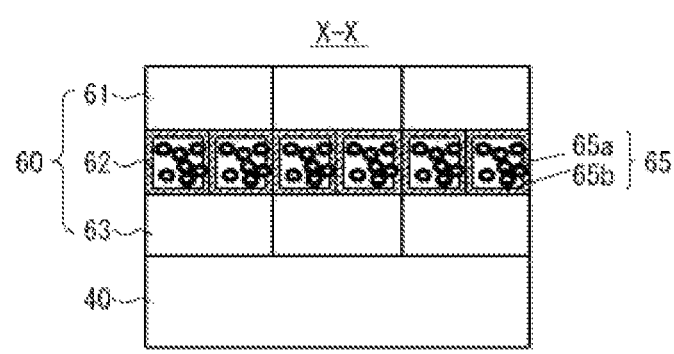
FIG. 2B is a schematic block diagram showing a configuration example of the scramjet engine according to the embodiment.

FIG. 2A and FIG. 2B are schematic block diagrams showing a configuration example of the scramjet engine according to the present embodiment. FIG. 2A is a block diagram, and FIG. 2B is a cross-section view of FIG. 2A along XX. Moreover, the scramjet engine 11 includes a fuel supply system 15. The fuel supply system 15 pyrolyzes a liquid fuel whose main component is hydrocarbon with large carbon number to generate the reformed fuel whose main component is hydrocarbon with small carbon number, and supplies them to the combustion chamber 40. The fuel supply system 15 includes a fuel reforming section 60, a fuel tank 71, a flow rate adjustment valve 76, an electronic control unit (ECU) 77, and sensors 80-83.

As shown in FIG. 2A, the fuel tank 71 has a liquid fuel (for example, jet fuel such as JetA-1 fuel) which includes hydrocarbon with large carbon number, as a main component. The fuel in the fuel tank 71 is supplied to the fuel reforming section 60 via a pipe 72. The flow rate adjustment valve 76 is provided on the pipe 72 and adjusts an amount of fuel supplied to the fuel reforming section 60 under control of the ECU 77. The fuel reforming section 60 pyrolyzes the liquid fuel by heat of the combustion chamber 40 to generate a gaseous reformed fuel. Since the pyrolyzing reaction is an endoergic reaction, the fuel reforming section 60 cools the combustion chamber 40. Such cooling is sometimes called as regenerative cooling. The reformed fuel generated in the fuel reforming section 60 is supplied to the injector 30 through the pipe 75. Details about the fuel reforming section 60 will be described later. The injector 30 sprays the reformed fuel in the air current of the compressed air, in the combustion chamber 40. The reformed fuel is combusted in the combustion chamber 40. The sensors 80-82 detect a situation of the fuel reforming section 60. The sensor 83 detects a situation of the combustion chamber 40. Each of sensors 80-83 includes at least one of a thermal flow rate sensor, a temperature sensor, a pressure sensor, and a flow rate sensor. The ECU 77 controls the flow rate adjustment valve 76 and the injector 30 or the like, based on the situation of the fuel reforming section 60 and the combustion chamber 40 (outputs of the sensors 80-83). By controlling the flow rate adjustment valve 76 based on the situations of the fuel reforming section 60 and the combustion chamber 40, an amount of fuel supplied to the fuel reforming section 60 is adjusted based on the situations of the fuel reforming section 60 and the combustion chamber 40. Since there is a case that when an amount of the liquid fuel supplied to the fuel reforming section 60 fluctuates, an amount of the generated reformed fuel fluctuates, it is preferable that an amount of the reformed fuel sprayed by the injector 30 corresponds to the amount of the supplied fuel. Therefore, the ECU 77 controls the injector 30 to correspond to the control for the flow rate adjustment valve 76.

The fuel reforming section 60 will be further explained. The fuel reforming section 60 vaporizes the liquid fuel primarily consisting of hydrocarbon with large carbon number by a heat of the combustion chamber 40, reforms (pyrolyzes) it, and generates a gaseous reformed fuel primarily consisting of hydrocarbon having carbon number smaller than that of the fuel. The fuel reforming section 60 includes a preheat vaporization section 63 and a decomposition reaction section 62, and preferably further includes an outside cooling section 61.

The preheat vaporization section 63 is provided at a position which is the closest to the combustion chamber 40 in the fuel reforming section 60, and exchanges heat with the combustion chamber 40. That is, the preheat vaporization section 63 is received heat from the combustion chamber 40, heats the liquid fuel flowing inside by the received heat, and generates a gaseous fuel. In other words, the liquid fuel flows an inside of the preheat vaporization section 63, a state of the fuel is changed to gas from liquid, and the combustion chamber 40 is cooled by a sensible heat and evaporative latent heat of the fuel. Transformation of a state of the fuel from liquid to gas is preferable not only from a viewpoint of cooling but also from a viewpoint of setting a state of the fuel suitable for a catalytic reaction. Here, the preheat vaporization section 63 is preferably arranged on and contacts the combustion chamber 40. It is because heats can be efficiently received from the combustion chamber 40.

The decomposition reaction section 62 includes a catalyst 65 for pyrolysis (for reforming), is provided on the preheat vaporization section 63, and exchanges heat with the preheat vaporization section 63. That is, the heat is supplied to the decomposition reaction section 62 from the preheat vaporization section 63, and the decomposition section 62 utilizes the heat and the catalysts 65 to pyrolyze the fuel flowing in the decomposition reaction section 62 and generate the reformed fuel. Especially, since the pyrolysis reaction of the fuel with the catalyst 65 is an endothermic reaction, the decomposition reaction section 62 consumes much heat from the preheat vaporization section 63. Here, the heat supplied from the preheat vaporization section 63 can be considered as heat supplied from the combustion chamber 40 via the preheat vaporization section 63. That is, the decomposition reaction section 62 cools the combustion chamber 40 by depriving much heat via the preheat vaporization section 63 by the pyrolysis reaction (the reforming reaction). In this time, it is preferable to arrange the preheat vaporization section 63 between the decomposition reaction section 62 and the combustion chamber 40, from viewpoints of suppressing a rapid increase in temperature of the decomposition reaction section 62 to prevent deactivation of the catalyst, and easily obtaining a catalytic reaction temperature range (for example: from 400 degrees C. to 600 degrees C.) that is suitable for the catalytic reaction.

The outside cooling section 61 is provided on the decomposition reaction section 62 and exchanges heat with the decomposition reaction section 62. That is, the heat is supplied to the outside cooling section 61 from the decomposition reaction section 62, and the outside cooling section 61 utilizes the heat to heat the fuel flowing through its inside. In other words, the outside cooling section 61 utilizes the heat from the decomposition reaction section 62 for heating the liquid fuel to block the heat, and prevents heat from damaging electric devices (for example: ECU 77) that are provided above the outside cooling section 61.

The fuel (liquid) of tank 71, which includes hydrocarbon with large carbon number as a main component, is supplied to the outside cooling section 61 through the pipe 72 while a flow rate is adjusted by the flow rate adjustment valve 76. The fuel (liquid) is heated by the decomposition reaction section 62 in the outside cooling section 61. After that, the heated fuel (liquid) is supplied to the preheat vaporization section 63 through the pipe 73. The fuel (liquid) is heated by the heat of the combustion chamber 40 and becomes a gaseous fuel. After that, the heated fuel (gas) is supplied to the decomposition reaction section 62 through the pipe 74. The fuel (gas) is heated by heat of the preheat vaporization section 63, and is pyrolyzed by the catalyst 65 to become a reformed fuel (gas) that includes hydrocarbon with small carbon number as a main component. After that, the reformed fuel (gas) is supplied to the injector 30 through the pipe 75.

A fuel channel of the fuel reforming section is provided to surround the combustion chamber 40. In the example of FIG. 2A and FIG. 2B, the fuel reforming section 60 is provided above the combustion chamber 40. For example, specifically, the fuel channel of the fuel reforming section 60 is shown in FIG. 2B. A fuel channel of the preheat vaporization section 63 is provided on a top of the combustion chamber 40. In this example, three fuel channels, each of which has a rectangular cross-section, are provided. At a top of the preheat vaporization section 63, a fuel channel of the decomposition reaction section 62 is provided. In this case, six fuel channels, each of which has a rectangular cross-section, are provided. Then, two fuel channels of the decomposition reaction section 62 are provided on one of the fuel channels of the preheat vaporization section 63. Catalysts 65 are provided in each fuel channel of the decomposition reaction section 62. It is preferable that number of fuel channels per unit volume of the decomposition reaction section 62 is relatively large, since a surface area of an inner wall of the decomposition reaction section 62 can be relatively large. As a result, a surface area of the catalysts 65 can be relatively large, and a pyrolysis reaction can reliably proceed. At a top of the decomposition reaction section 62, a fuel channel of the outside cooling section 61 is provided. In this case, three fuel channels, each of which has a rectangular cross-section, are provided. Then, one fuel channel of the outside cooling section 61 is provided on two fuel channels of the decomposition reaction section 62. However, the number of fuel channels at each of above-mentioned parts is arbitrary, and may be more or less.

The decomposition reaction section 62 includes the catalyst 65 in its fuel channel. The catalyst 65 is illustrated by a catalyst 65*b* arranged on an inner wall of the fuel channel, and a catalyst 65*a* having a grained shape or ring-shape arranged in the fuel channel. The catalyst 65 preferably includes: a zeolitic catalyst such as H-ZSM-5 catalyst; PGM (Platinum Group Metals: the platinum family) system catalyst such as platinum catalyst, palladium catalyst, and rhodium catalyst; and a catalyst including at least one of oxide catalysts having large surface area or a complex thereof. Among these, H-ZSM-5 catalyst has a high effect for promoting the above-mentioned pyrolysis. Therefore, it is preferable to include H-ZSM-5 catalyst as the catalyst 65, from a viewpoint of decrease a size of the fuel reforming section 60. Moreover, when the zeolitic catalyst supporting platinum group elements, an oxide system catalyst, or both of them is included as the catalyst 65, the above-mentioned effect for promoting the pyrolysis becomes higher than in a case of separately arranging the PGM system catalyst and the zeolitic catalyst. Therefore, it is preferable to use these catalysts as the catalyst 65 from a viewpoint of further decreasing the size of the fuel reforming section 60.

As mentioned above, the fuel reforming section 60 according to this embodiment includes fuel channels so that the preheat vaporization section 63, the decomposition reaction section 62, and the outside cooling section 61 surround the combustion chamber 40. The outside cooling section 61 rises a temperature of the liquid fuel in the fuel channel, restrains a heat loss to an outside of the combustion chamber 40 by the sensible heat, relatively cools the outside, and prevents damages of the electric devices (for example: ECU 77). The preheat vaporization section 63 changes the liquid fuel flowing in the fuel channel to the gaseous fuel, cools the combustion chamber 40 by the sensible heat and the evaporative latent heat, and puts a state of the fuel suitable for a catalytic reaction. Further, a rapid increase in temperature of the decomposition reaction section 62 is suppressed, deactivation of the catalyst is prevented, and a catalytic reaction temperature range (for example: 400 degrees C.~600 degrees C.) is suitable for the catalytic reaction is formed.

The decomposition reaction section 62 pyrolyzes the fuel flowing in the fuel channel by the catalyst 65 to generate the reformed fuel and cool the combustion chamber 40 by the endoergic reaction of the pyrolysis. As mentioned above, the fuel supply system 15 is considered as a regenerative cooling system, which effectively decomposes a carbon fuel with large carbon number into a carbon fuel with small carbon number to concurrently cool the combustion chamber 40 and the outside of the combustion chamber 40.

Also when selecting the temperature of the combustion chamber 40 as a situation of the combustion chamber 40 to be managed (when sensor 83 detects the temperature of the combustion chamber 40), the temperature of the combustion chamber 40 can be effectively managed by adjusting an amount of endotherm in the pyrolysis of the fuel.

FIG. 3 is a graph indicating an example of a relation between a temperature and a state of the fuel, in the fuel supply system according to the present embodiment. The upper graph indicates one example of a relation between the temperature of the fuel (the vertical axis) and a position in the fuel supply system 15 (transverse). The downside graph indicates one example of a relation between the states of the fuel (A: liquid (hydrocarbon fuel), B: gas (hydrocarbon fuel), and C: decomposed hydrocarbon fuel (reformed fuel)) and the position in the fuel supply system 15 (transverse). The undermost draw is a schematic view showing positions in the fuel supply system shown in each graph, correlating with FIG. 2A.

In the fuel tank 71, the temperature of the (hydrocarbon) fuel is low of T1, and its state is A: liquid. In the outside cooling section 61, the temperature of the fuel does not increase so much to be about T1, and its state remains A: liquid. Here, a temperature of a component part (for example, a part including ECU 77) arranged at the outside of the combustion chamber 40 (and the fuel reforming section 60) becomes not so high because of a flow of the liquid fuel in the outside cooling section 61, and is considered as about T1 that is almost equal to the temperature of the liquid fuel. After that, the liquid fuel is supplied to the preheat vaporization section 63.

In the preheat vaporization section 63, the temperature of fuel gradually rises by supply of heat from the combustion chamber 40. In the example shown in this Figure, the temperature of the fuel rises to about T2 from about T1. Meanwhile, the liquid fuel is gradually vaporized by the supplied heat. Then, finally, the state of the fuel becomes state B: gas. On the other hand, the combustion chamber 40 is cooled by the sensible heat and the evaporative latent heat. After that, the gaseous fuel is supplied to the decomposition reaction section 62. The Gaseous fuel is in the condition where the catalytic reaction is easy to be stably promoted.

In the decomposition reaction section 62, a pyrolysis reaction occurs by the heat supplied from the preheat vaporization section 63 (the heat supplied from the combustion chamber 40 through the preheat vaporization section 63) and the catalyst 65. At this time, the temperature of the fuel is slightly decreased because of the endothermic reaction in the pyrolysis reaction and a heat loss to the outside cooling section 61, and controlled to be a temperature suitable for the catalytic reaction (for example: T2~T3). As described later, the temperature suitable for the catalytic reaction is illustrated by 400 degrees C.~600 degrees C. when the catalyst 65 is the zeolitic catalyst (for example: H-ZSM-5 catalyst).

Next, a method of operating the scramjet engine 11 (FIG. 1, FIG. 2A, and FIG. 2B) according to the present embodiment will be explained.

For example, the method of operating scramjet engine 11 includes a first step to a fourth step. The first step is a step of compressing an air by the air compression section to generate a compressed air. The compressed air is supplied to the combustion chamber 40. The second step is a step of spraying a reformed fuel in the compressed air of the combustion chamber 40 by the injector 30. The third step is a step of combusting the reformed fuel in the combustion chamber 40. The fourth step is a step of pyrolysing the hydrocarbon system fuel by the heat of the combustion chamber 40 at the fuel reforming section 60 to generate the reformed fuel, and cooling the combustion chamber.

Here, the fourth step, in which the fuel reforming section 60 generates the reformed fuel to cool the combustion chamber 40, includes following fifth step and sixth step. The fifth step is a step of heating the fuel by the preheat vaporization section 63 provided on the combustion chamber 40. The sixth step is a step of pyrolysing the heated fuel to generate the reformed fuel, by the decomposition reaction section that is provided on the preheat vaporization section 63 and includes the catalyst 65 for pyrolysis. Moreover, the fourth step may further include a step of heating the fuel by the outside cooling section 61 provided on the decomposition reaction section 62 to supply the fuel to the preheat vaporization section 63.

By the above-mentioned method, the scramjet engine 11 according to the present embodiment is operated.

(Examination about the Catalyst Activated Temperature Range)

Next, examination was carried out for a temperature range in which the catalyst 65 stably promotes the catalytic reaction. Specifically, a change of decomposition amount of hydrocarbon was observed by changing a temperature of the catalytic layer, when a fuel including hydrocarbon with large carbon number as a main component is continuously leaded through a catalytic layer to be pyrolyzed into a fuel including hydrocarbon with small carbon number. Furthermore, it was confirmed whether or not a deposition of carbide existed, which decreases the catalytic reaction.

Figure 4:
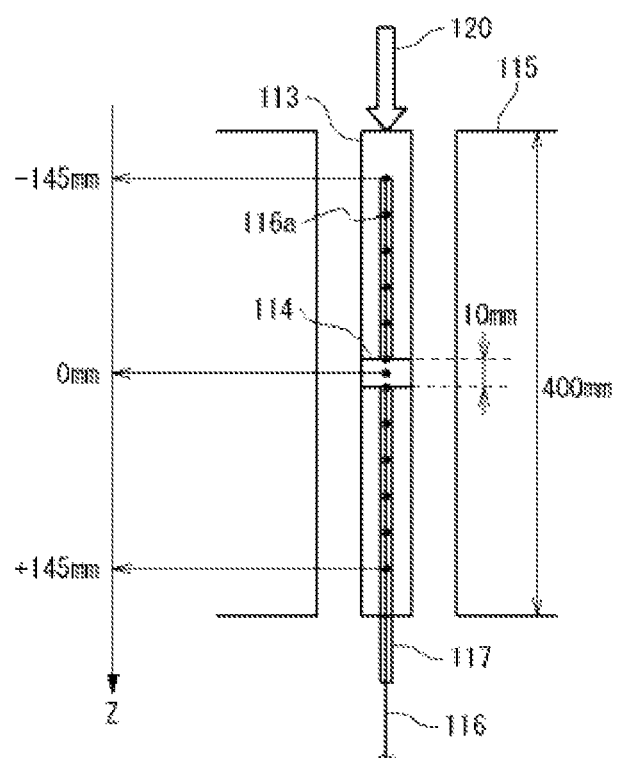
FIG. 4 is a schematic view showing a configuration of an evaluation test for heat of decomposition reaction.

Here, the examination was carried out by using a decomposition reaction heat evaluation test. FIG. 4 is a schematic view showing a configuration of the decomposition reaction heat evaluation test. A device for evaluating a reaction heat in the pyrolysis reaction of the fuel includes a reaction tube 113, an H-ZSM-5 catalytic layer 114, an electric furnace 115, a thermocouple 116, and a thermocouple protective tube 117. The reaction pipe 113 has 17.3 mm of outside diameter, 12.7 mm of caliber, and 400 mm of length. Z-coordinate is defined along a line parallel to an axial direction of the reaction tube 113. The reaction pipe 113 is arranged in the electric furnace 115. The electric furnace 115 has 400 mm of length in the axial direction of the reaction tube 113. The thermocouple 116 is arranged in the reaction tube 113 and protected by the thermocouple protective tube 117. The thermocouple protective tube 117 has 4 mm of outside diameter, and 2 mm of caliber. Z-coordinate which is center of the reaction tube 113 is defined as 0 mm. A plurality of temperature measured points 116a are set in a range from −145 mm to +145 mm in Z-coordinate of the reaction tube 113. The H-ZSM-5 catalytic layer 114 is arranged at a center (Z coordinate: 0 mm) of the reaction tube 113. The H-ZSM-5 catalytic layer 114 is supported by an eye plate and glass wool which is not shown. A thickness of the H-ZSM-5 catalytic layer 114 is 10 mm, and a quantity of catalyst is 1 g (1 cc). Reaction temperatures are 300° C., 450° C., and 600° C., and a reaction pressure is 0.9 MPa. Under the above-mentioned condition, a vaporized fuel 120 was continuously introduced into the reaction tube 113 for one hour for stabilizing the decomposition reaction. Then, the hydrocarbon fuel which had passed through the catalytic layer 114 was analyzed by a gas chromatography and a mass spectroscope. Moreover, the endothermic reaction of the catalytic layer 114 was measured with the thermocouple installed in the catalytic layer 114. However, LHSV (Liquid Hourly Space Velocity=flow rate of fuel (cc/h)/the volume of the catalytic layer) is set to 200/h. As the fuel, dodecene and JetA-1 fuel were used.

Figure 5A:
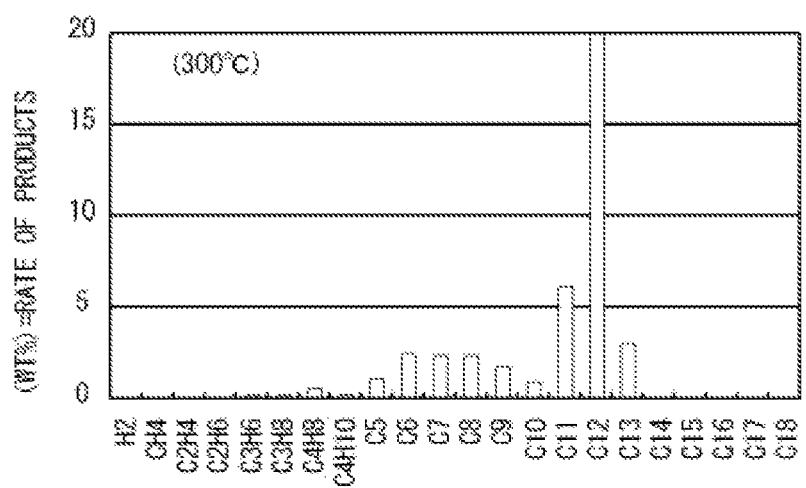
FIG. 5A is a graph showing an evaluation result of dodecene ($C_{12}H_{24}$) at each of reaction temperatures.
Figure 5B:
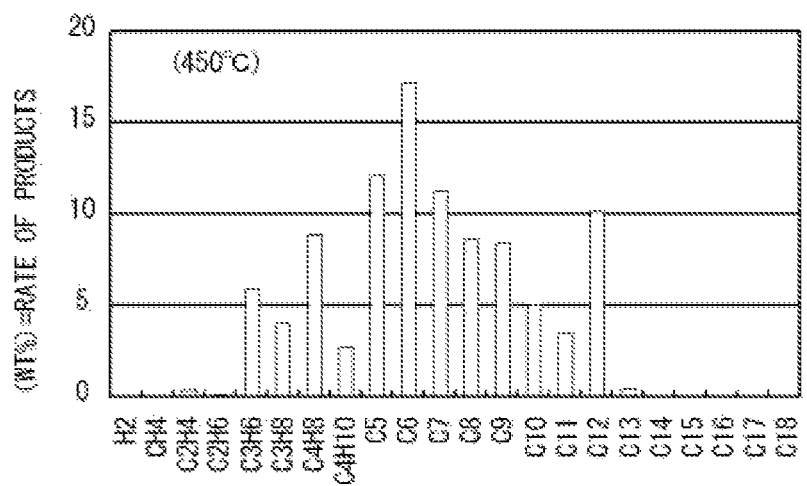
FIG. 5B is a graph showing an evaluation result of dodecene ($C_{12}H_{24}$) at each of reaction temperatures.
Figure 5C:
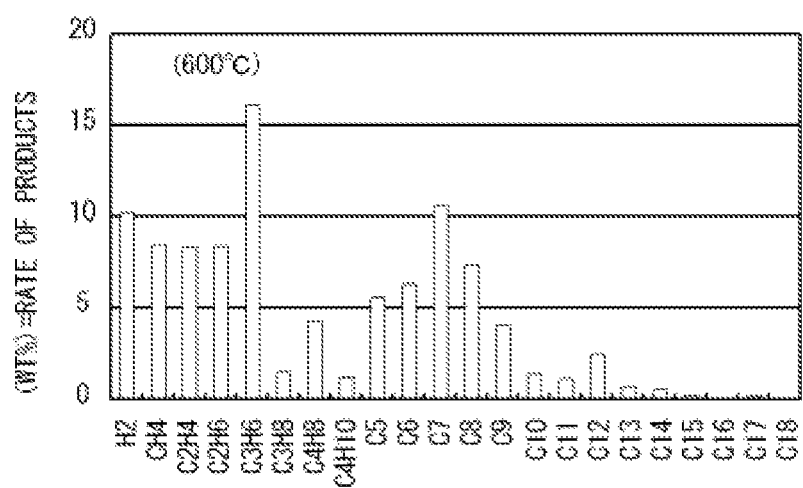
FIG. 5C is a graph showing an evaluation result of dodecene ($C_{12}H_{24}$) at each of reaction temperatures.

FIGS. 5A to 5C are graphs showing measurement results at each reaction temperatures of dodecene ($C_{12}H_{24}$). FIG. 5A shows a measurement result at 300° C., FIG. 5B shows a measurement result at 450° C. and FIG. 5C shows a measurement result at 600° C. The vertical axis shows a rate (wt %) of a product, and the transverse shows a kind of the product.

As shown in FIG. 5A, at the reaction temperature of 300° C., molecules with large carbon number are hardly decomposed. $C_{12}$ inversion rate remains at 18.0 wt %. However, carbon deposits are hardly detected (<5 wt %). At the reaction temperature of 450° C., as shown in FIG. 5B, molecules with large carbon number is almost decomposed. Then, a number of molecules with small carbon number are generated, which is easily combusted at supersonic combustion. The $C_{12}$ inversion rate reaches at 89.4 wt %. Carbon deposits are hardly detected (<5 wt %). At the reaction temperature of 600° C., as shown in FIG. 5C, the decomposition of molecules with large carbon number is promoted, and a number of molecules with small carbon number are generated. The $C_{12}$ inversion rate reached at 96.4 wt %. However, a number of carbon deposits (solid body carbide) are deposited (36 wt %), and a caulking phenomenon occurs, which blocks the fuel channel.

Although there is not illustration, the Jp-4 fuel yields a result similar to the pyrolysis of dodecene. Also, the above result could be obtained not only for the zeolitic catalyst but also for the complex catalyst of the zeolitic catalyst and the PGM system catalyst.

According to the examination result of the above-mentioned catalyst activated temperature range, as a temperature range which causes a stable catalytic reaction, the following point was proved. That is, in order to activate the catalytic reaction, temperature equal to or more than 400° C. and less than 600° C. is appropriate when a zeolitic catalyst or a complex of zeolitic catalyst and PGM system catalyst is used. Controlling the temperature of the decomposition reaction section 62 to be in such temperature range, a desired pyrolysis reaction can be progressed.

For example, in the above-mentioned scramjet engine 11, a method can be also considered, which uses only the decomposition reaction section 62 and does not use the preheat vaporization section 63 and the outside cooling section 61. That is, it is a method in which only the decomposition reaction section is directly arranged on top of the combustion chamber 40. In such a case, the following situation may be occurred. (1) Since the combustion chamber 40 is high temperature equal to or more than thousands of degrees C., the decomposition reaction section on the combustion chamber cannot be easily controlled, and the temperature of the decomposition reaction section may be rapidly increased. In this case, the catalyst is inactivated, and the fuel cannot be pyrolyzed. It is considered to keep a sufficient distance between the decomposition reaction section and the combustion chamber 40 as a countermeasure, but it is not appropriate because cooling of the combustion chamber 40 by the endothermic reaction of the decomposition reaction section becomes difficult. (2) Also, in the catalytic reaction, reactivity varies widely depending on whether the fuel to be reformed is liquid or gas. If it is liquid, high reactivity cannot be obtained since a contact frequency between the fuel and the catalyst is low. When the decomposition reaction section is arranged on the combustion chamber 40, since the fuel in which liquid and gas is mixed contacts the catalyst, the reactivity becomes unstable, and the effective catalytic reaction cannot be obtained. Furthermore, the probability of catalyst being stripped from the flow channel by vaporization/bumping of the fuel or the like to block the flow channel becomes high.

However, according to the present embodiment, in the above-mentioned scramjet engine 11, the preheat vaporization section 63 is arranged on the combustion chamber 40, and the decomposition reaction section 62 is arranged on the preheat vaporization section 63. That is, the heat of the combustion chamber 40 is supplied to the preheat vaporization section 63 at first, and supplied to the decomposition reaction section 62 after that. The fuel is supplied to the decomposition reaction section 62 via the preheat vaporization section 63. Accordingly, the fuel to be supplied to the decomposition reaction section 62 can be previously changed to gas at the preheat vaporization section 63. As a result, the occurrence of the above-mentioned situation (2) can be prevented. Also, since the preheat vaporization section 63 is provided between the decomposition reaction section 62 and the combustion chamber 40, the heat of the combustion chamber 40 is not directly supplied to the decomposition reaction section 62. As a result, the occurrence of the above-mentioned situation (1) can be prevented.

Moreover, in the above-mentioned scramjet engine 11, when the outside cooling section 61 is arranged on the decomposition reaction section 62, it is possible to prevent electronic devices or the like (for example: ECU 77) arranged at the outside of the fuel reforming section 60 becomes excessively high temperature. As a result, malfunctions of these electronic devices can be prevented, and these electronic devices can carry out stable and appropriate control.

As mentioned above, according to the present embodiment, the pyrolysis reaction of the fuel using the catalytic can be stable, by changing the liquid fuel to the gas fuel and suppressing excessive heat flowing into the catalytic reaction area. As a result, molecules with small carbon number can be sufficiently generated, which is effective for efficient combustion. At the same time, the combustion chamber can be effectively cooled by using the endothermic of the pyrolysis reaction. Moreover, it can be suppressed that the heat transmits to the outside electronic devices, by providing the outside cooling section that pre-heats the fuel.

In the above-mentioned embodiment, the configuration of the fuel reforming section 60 on the combustion chamber 40 is not limited to the above-mentioned configuration. For example, FIGS. 6A to 6D are schematic sectional views showing configurations of variation examples of the scramjet engine according to the present embodiment. These figures are sectional views of XX in FIG. 2A, and indicate the combustion chamber 40 and the fuel reforming section 60 of the fuel supply system 15.

Figure 6A:
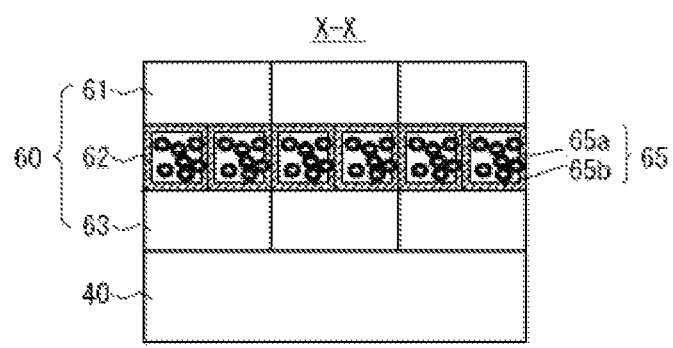
FIG. 6A is a schematic sectional view showing a configuration of a variation example of the scramjet engine according to the embodiment.

The explanation of the combustion chamber 40 and the fuel reforming section 60 in the example of FIG. 6A will be omitted since it is same as FIG. 2B.

Figure 6B:
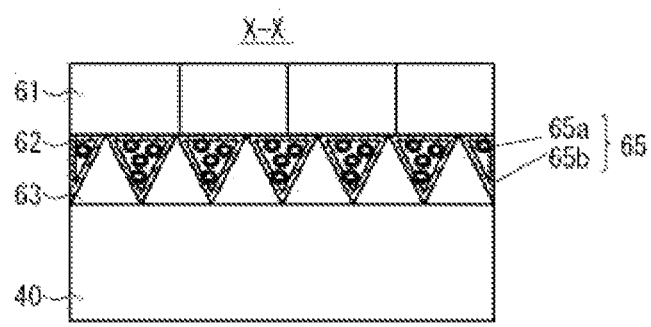
FIG. 6B is a schematic sectional view showing a configuration of a variation example of the scramjet engine according to the embodiment.

In the example of FIG. 6B, the fuel reforming section 60 is provided on the combustion chamber 40. As shown in FIG. 6B, fuel channels of the preheat vaporization section 63 are provided on the top of the combustion chamber 40. In the example of this Figure, six fuel channels each of which has a triangle cross-section are provided. The bottom line of the triangle contacts an upper side of the combustion chamber 40. Fuel channels of the decomposition reaction section 62 are provided on the top of the preheat vaporization section 63. In the example of this Figure, seven fuel channels are provided, each of which has an inverted triangle cross-section (two of them are half of the inverted triangle). Two lower sides of the inverted triangle contacts each of adjacent upper sides of the two triangles of the preheat vaporization section 63. In other words, one fuel channel of the decomposition reaction section 62 is provided on the two fuel channels of the preheat vaporization section 63 so as to be sandwiched by its two fuel channels. The catalyst 65 is included in each fuel channel of the decomposition reaction section 62. Such structure of the preheat vaporization section 63 and decomposition reaction section 62 is preferable, since an area of contact per unit volume between the preheat vaporization section 63 and the decomposition reaction section 62 can be increased. As a result, the heat exchange between the preheat vaporization section 63 and decomposition reaction section 62 can be more effective, and the pyrolysis reaction can be reliably progressed. Fuel channels of the outside cooling section 61 are provided on the top of the decomposition reaction section 62. In the example of this Figure, four fuel channels each of which has a rectangular cross-section are provided. Then, one fuel channel of the outside cooling section 61 is provided on to 1.5 fuel channels of the decomposition reaction section 62. However, the number of the fuel channels in each of above-mentioned sections is arbitrary.

Figure 6C:
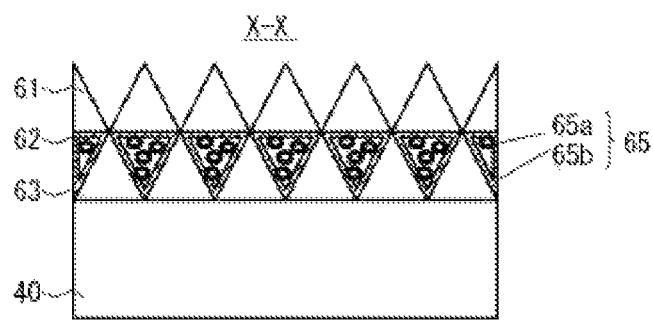
FIG. 6C is a schematic sectional view showing a configuration of a variation example of the scramjet engine according to the embodiment.

In the example of FIG. 6C, the preheat vaporization section 63 and the decomposition reaction section 62 are similar to FIG. 6B. The fuel channels of the outside cooling section 61 are provided on the top of the decomposition reaction section 62. In the example of this Figure, seven fuel channels each of which has a triangle cross-section is provided (two of them are half of the triangle). The bottom line of the triangle contacts the upper side of the inverted triangle of the decomposition reaction section 62. In other words, one fuel channel of the outside cooling section 61 is provided on one fuel channel of the decomposition reaction section 62. Such structure of the outside cooling section 61 is preferable, since surface area per unit volume for contacting the outside can be increased in the outside cooling section 61. Because of this, the heat-exchange between the outside cooling section 61 and the outside can be effective, and the temperature of the decomposition reaction section 62 can be easily controlled. The number of the fuel channels in each of the above-mentioned sections is arbitrary.

Figure 6D:
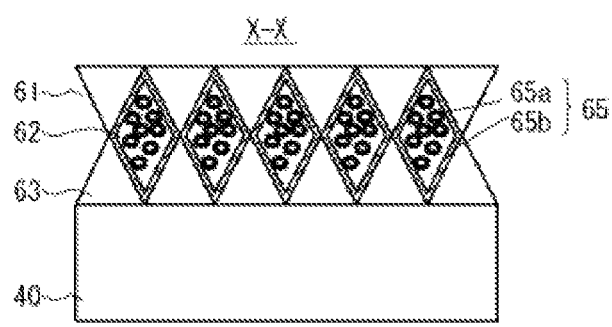
FIG. 6D is a schematic sectional view showing a configuration of a variation example of the scramjet engine according to the embodiment.

In the example of FIG. 6D, the preheat vaporization section 63 is similar to FIG. 6B. The fuel channels of the decomposition reaction section 62 are provided on the top of the preheat vaporization section 63. In the example of this Figure, five fuel channels each of which has a cross-section of diamond shape are provided. Two lower sides of the diamond shape contact adjacent upper sides of the two triangles of the preheat vaporization section 63. In other words, one fuel channel of the decomposition section 62 is provided on the two fuel channels of the preheat vaporization section 63 so as to be sandwiched by two fuel channels. The catalyst 65 is included in the each fuel channel of the decomposition reaction section 62. Such structure of the preheat vaporization section 63 and the decomposition reaction section 62 is preferable, since contact area per unit volume can be increased between the preheat vaporization section 63 and the decomposition reaction section 62. Because of this, the heat-exchange between the preheat vaporization section 63 and the decomposition reaction section 62 can be effective, and the pyrolysis reaction can be reliably promoted. Fuel channels of the outside cooling section 61 are provided on the top of the decomposition reaction section 62. In the example of this Figure, six fuel channels each of which has an inverted triangle cross-section are provided. Two lower sides of the inverted triangles contact adjacent upper sides of the two diamond shapes of the decomposition reaction section 62. In other words, one fuel channel of the outside cooling section 61 is provided on the two fuel channels of the decomposition reaction section 62 so as to be sandwiched by two fuel channels. Such structure of the outside cooling section 61 is preferable, since contact surface area per unit can be increased between the outside cooling section 61 and the decomposition reaction section 62. Because of this, the heat-exchange between the outside cooling section 61 and the decomposition reaction section 62 can be efficient, the heat-exchange between the outside cooling section 61 and the outside can be efficient, and the temperature of the decomposition reaction section 62 can be easily controlled. The number of the fuel channels in each of the above-mentioned sections is arbitrary.

According to these configurations, the effects explained by FIGS. 2A and 2B can be obtained. Also, for example, the cross-section of the fuel channels of the preheat vaporization section 63 may be a rectangular section, and each of fuel channels of the decomposition reaction section 62 and outside cooling section 61 may be a triangle and inverted triangle, or a triangle and diamond shape. Further, for example, fuel channels, each having a hexagonal cross-section shape, may be stacked to be a honeycomb, thereby providing the preheat vaporization section 63 (but, pentagon-shaped cross-section whose combustion chamber side is flat), the decomposition reaction section 62, and the outside cooling section 61. In these cases, the effects explained by FIGS. 2A and 2B can be also obtained.

As mentioned above, with reference to the embodiments, the fuel supply system, the scramjet engine and operation method of the same were explained, however, it is apparent that the present invention is not limited to the above-mentioned embodiment, and that each embodiment can be changed in a range of the technical ideas of the present invention. Furthermore, for example, the present invention can be applied not only to an aircraft but also to a flying object or a rocket.

What is claimed is:

1. A fuel supply system, comprising:
    a fuel reforming section configured to pyrolyze a hydrocarbon fuel by heat of a combustion chamber of a scramjet engine to generate a reformed fuel and cool the combustion chamber,
    wherein the fuel reforming section comprises:
    a preheat vaporization section including a first fuel channel which is provided along an upper surface of the combustion chamber and configured to heat the hydrocarbon fuel with heat from the combustion chamber; and
    a decomposition reaction section, including a second fuel channel containing a reforming catalyst for pyrolysis, the second fuel channel being configured to pyrolyze the heated hydrocarbon fuel received from the first fuel channel of the preheat vaporization section with the reforming catalyst to generate the reformed fuel,
    wherein the second fuel channel of the decomposition reaction section is in parallel to the first fuel channel of the preheat vaporization section,
    wherein an upper surface of the first fuel channel of the preheat vaporization section contacts a lower surface of the second fuel channel of the decomposition reaction section,
    wherein the fuel reforming section supplies the reformed fuel to the combustion chamber, and
    wherein the reforming catalyst includes a zeolitic catalyst.

2. The fuel supply system according to claim 1, wherein the zeolitic catalyst includes an H-ZSM-5 catalyst.

3. The fuel supply system according to claim 1, wherein the zeolitic catalyst supports platinum group elements.

4. The fuel supply system according to claim 1, wherein the reforming catalyst further includes an oxide catalyst that supports platinum group elements.

5. The fuel supply system according to claim 1, wherein the fuel reforming section further includes an outside cooling section provided along an upper surface of the decomposition reaction section, and
    wherein the fuel is supplied to the preheat vaporization section via the outside cooling section.

6. The fuel supply system according to claim 1, wherein a temperature of the decomposition reaction section is equal to or more than 400° C. and less than 600° C.

7. A scramjet engine, comprising:
    an air compression section configured to compress an air to generate a compressed air;
    an injector configured to inject a reformed fuel in the compressed air;
    a combustion chamber configured to combust the reformed fuel by using the compressed air; and
    a fuel supply system provided on the combustion chamber to be heat-exchangeable with the combustion chamber,
    wherein the fuel supply system comprises:
    a fuel reforming section configured to pyrolyze a hydrocarbon fuel by heat of a combustion chamber of a scramjet engine to generate a reformed fuel and cool the combustion chamber,
    wherein the fuel reforming section comprises:
    a preheat vaporization section including a first fuel channel which is provided along an upper surface of the combustion chamber and configured to heat the hydrocarbon fuel with heat from the combustion chamber; and
    a decomposition reaction section, including a second fuel channel containing a reforming catalyst for pyrolysis, the second fuel channel being configured to pyrolyze the heated hydrocarbon fuel received from the first fuel channel of the preheat vaporization section with the reforming catalyst to generate the reformed fuel,
    wherein the second fuel channel of the decomposition reaction section is in parallel to the first fuel channel of the preheat vaporization section,
    wherein an upper surface of the first fuel channel of the preheat vaporization section contacts a lower surface of the second fuel channel of the decomposition reaction section,
    wherein the fuel reforming section supplies the reformed fuel to the combustion chamber, and
    wherein the reforming catalyst includes a zeolitic catalyst.

8. A method of operating a scramjet engine, wherein the scramjet engine comprises an air compression section, an injector, a combustion chamber, and a fuel reforming section,
    wherein the method comprises:
    compressing an air to generate a compressed air by the air compression section;
    injecting a reformed fuel in the compressed air by the injector;
    combusting the reformed fuel with the compressed air in the combustion chamber; and pyrolyzing a hydrocarbon fuel with heat of the combustion chamber by the fuel reforming section to generate the reformed fuel while cooling the combustion chamber, wherein the pyrolyzing a hydrocarbon fuel comprises:

heating the hydrocarbon fuel by heat from the combustion chamber in a first fuel channel of a preheat vaporization section, the first fuel channel being provided along an upper surface of the combustion chamber; and pyrolyzing the heated hydrocarbon fuel received from the first fuel channel of the preheat vaporization section by using a reforming catalyst provided in a second fuel channel of a decomposition reaction section to generate the reformed fuel, the second fuel channel being provided along an upper surface of the preheat vaporization section, wherein the second fuel channel of the decomposition reaction section is in parallel to the first fuel channel of the preheat vaporization section, and wherein an upper surface of the first fuel channel of the preheat vaporization section contacts a lower surface of the second fuel channel of the decomposition reaction section.

9. The fuel supply system according to claim 1,
wherein a cross-section of a flow channel of the preheat vaporization section is a rectangle whose lower side contacts the upper surface of the combustion chamber, and wherein a cross-section of a flow channel of the decomposition reaction section is a rectangle whose lower surface contacts the upper surface of the preheat vaporization section.

10. The fuel supply system according to claim 1, wherein the decomposition reaction section is configured so that the zeolitic catalyst of the second fuel channel of the decomposition reaction section derives heat from the combustion chamber through an endothermic reaction.

11. The scramjet engine according to claim 7, wherein the decomposition reaction section is configured so that the zeolitic catalyst of the second fuel channel of the decomposition reaction section derives heat from the combustion chamber through an endothermic reaction.

12. The method of operating a scramjet engine according to claim 8, wherein the decomposition reaction section is configured so that the zeolitic catalyst of the second fuel channel of the decomposition reaction section derives heat from the combustion chamber through an endothermic reaction.

* * * * *